Figure 1:
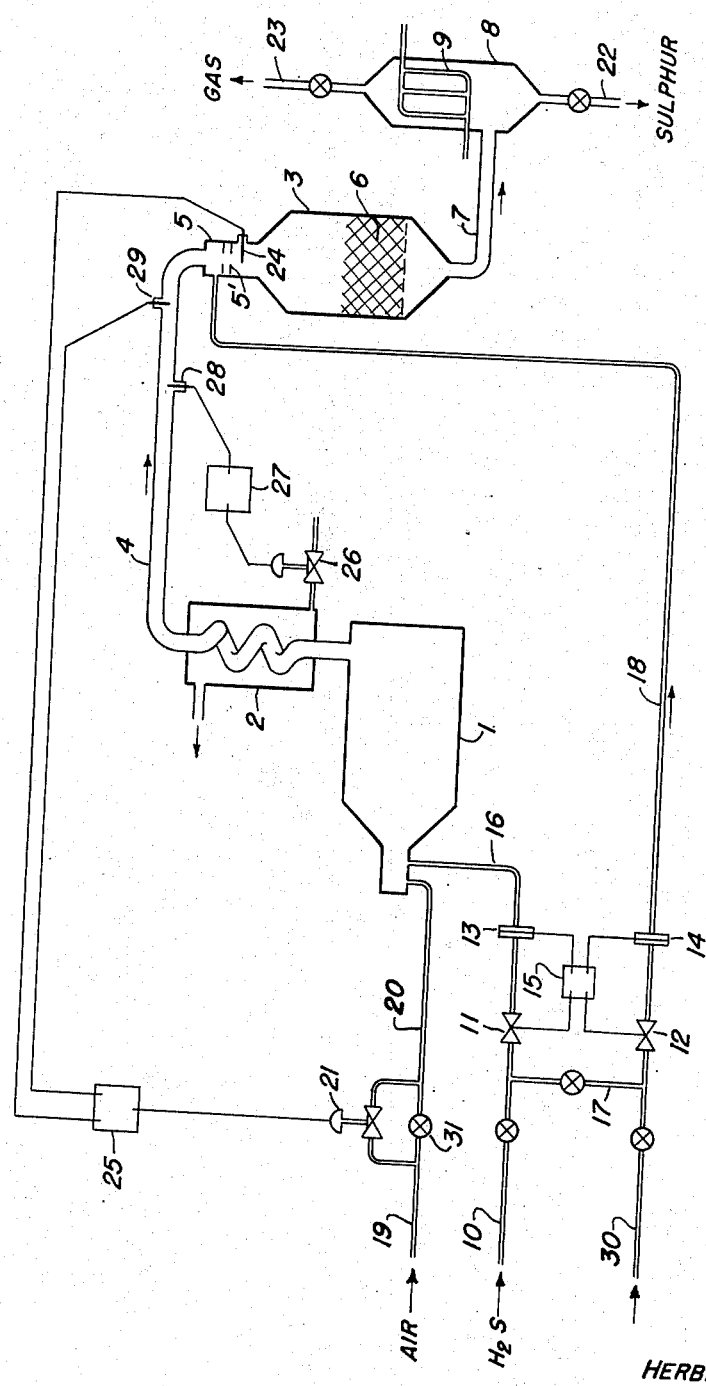

INVENTOR.
HERBERT M. ANDERSON
BY
Thomas G. Bell
AGENT

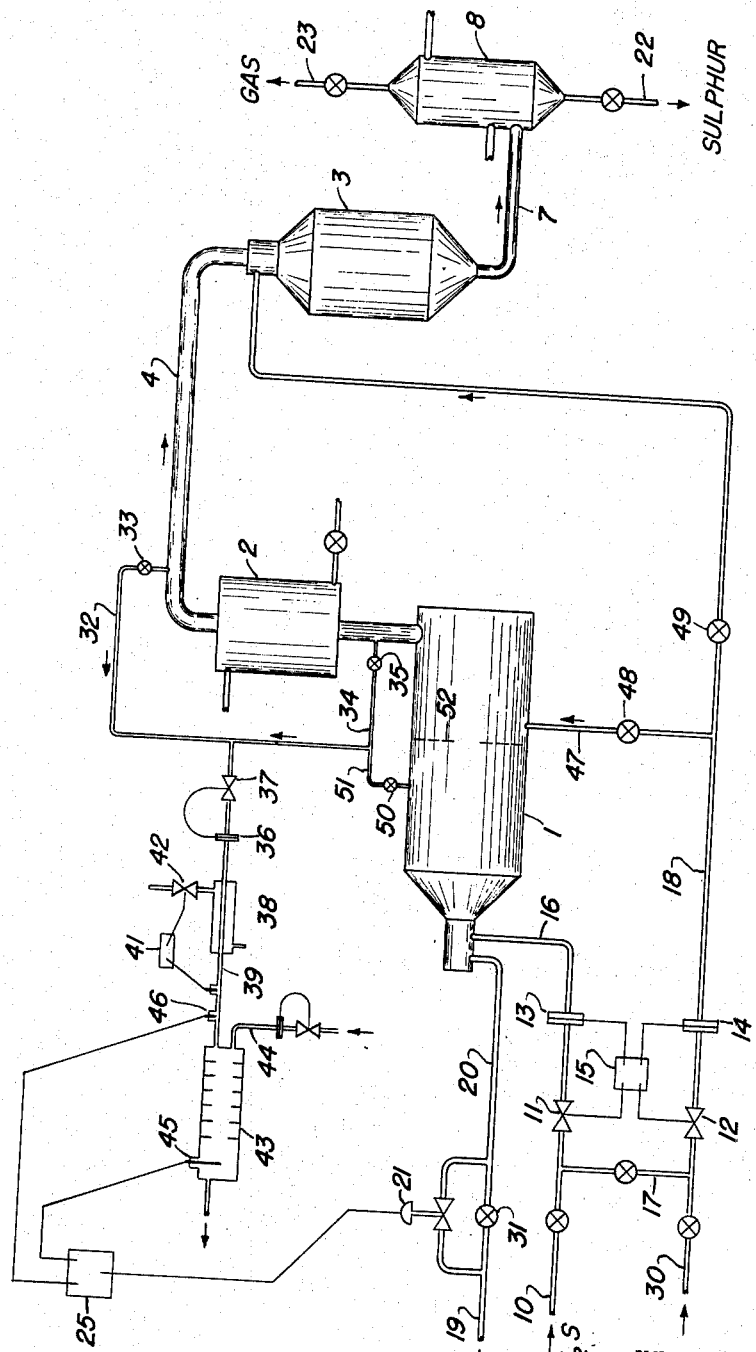

Patented Aug. 25, 1953

2,650,154

UNITED STATES PATENT OFFICE 2,650,154

PRODUCTION OF SULFUR FROM HYDROGEN SULFIDE

Herbert M. Anderson, Concord, Calif., assignor to Tide Water Associated Oil Company, San Francisco, Calif., a corporation of Delaware Application June 29, 1949, Serial No. 102,018

1 Claim. (Cl. 23—225)

This invention relates to the production of sulfur from hydrogen sulfide by the reaction of air, or other free oxygen with gases of high hydrogen sulfide content to form free sulfur. More particularly, the invention relates to a method of controlling the ratio of oxygen to the hydrogen sulfide fed to such a reaction in order to obtain optimum results.

Briefly, the invention contemplates reacting hydrogen sulfide with free oxygen to form free sulfur, the reactions taking place in two stages respectively represented by the following two equations:

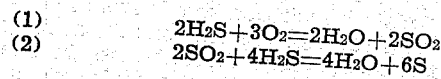

(1) $2H_2S + 3O_2 = 2H_2O + 2SO_2$
(2) $2SO_2 + 4H_2S = 4H_2O + 6S$

In accordance with the invention, the ratio of hydrogen sulfide to oxygen fed to the first stage, represented by Equation 1, is controlled in accordance with abnormal temperatures attained during the second stage, represented by Equation 2. If desired, such control may be effectuated by pilot apparatus operating upon a sample stream taken from the reaction gases from the first stage, all as more fully hereinafter described.

The invention is particularly adapted for the production of sulfur from hydrogen sulfide streams resulting from petroleum refining and other operations where the content of hydrocarbons and/or other combustible matter in the hydrogen sulfide varies sufficiently to make conventional methods of control quite difficult because of the oxygen consumed by the combustion of such contaminants.

Various methods have been proposed, based upon a combination of Equations 1 and 2 above, for burning hydrogen sulfide to produce free sulfur. Inasmuch as the reaction expressed by Equation 1 evolves a substantial quantity of heat, raising the temperature of the gases to a point where the equilibrium of Equation 2 becomes unfavorable for the intended purpose, it is common to carry out reaction 1 in a combustion chamber using one-third of the total hydrogen sulfide available, and then to cool the resulting gases to a temperature between about 500° F. and 750° F. before adding the remaining two-thirds of the hydrogen sulfide required for reaction 2. Customarily reaction 2 is completed by passing the mixed gases through one or more beds of catalyst to assist the reaction.

An alternate procedure which has been proposed is to feed all the hydrogen sulfide to the combustion chamber together with the exact quantity of air needed thereby completing reaction 1 and partly carrying out reaction 2 in the combustion chamber. The gases from the combustion chamber are then cooled to approximately 500° F. to 750° F. and passed over catalyst to complete reaction 2.

When it is attempted to carry out either of the above menioned two procedures using hydrogen sulfide containing varying amounts of hydrocarbons or other contaminants great difficulty is experienced in accurately maintaining the rate of air-supply needed for the combustion of both the hydrogen sulfide and the contaminants. For example it is common for hydrogen sulfide recovered from petroleum refinery operations to have a propane content which may fluctuate between 1% and 5%. Since the temperatures prevailing in the combustion chamber favor the combustion of the propane in preference to the hydrogen sulfide, and since one volume of propane consumes over three times the amount of oxygen required by one volume of hydrogen sulfide, the volume of air required to be supplied to the combustion chamber for reaction 1 above may vary by 15% or more. Even greater variation is encountered where all the hydrogen sulfide (and consequently all the hydrocarbon contaminant) is supplied to the combustion chamber.

Bearing in mind that a deficiency of air supplied to the conversion of the hydrogen sulfide to free sulfur results in the presence of substantial amounts of residual hydrogen sulfide in the tail-gases from the conversion, and an excess of air results in the presence of undesirable amounts of sulfur dioxide in the tail-gases, it will be readily seen that the amount of air supplied must be controlled within close limits and must be so regulated as to adjust for fluctuations in the hydrocarbon content and other impurities in the hydrogen sulfide. The present invention provides a means whereby the air-supply may be regulated, either manually or automatically, to adjust the air-supply for variations in the hydrocarbon content of the hydrogen sulfide. By its use the air-supply also may be adjusted for variations in the hydrogen sulfide content or volume of the hydrogen sulfide stream supplied to the process.

In accordance with the invention, I have found that, when hydrogen sulfide is added (preferably in stoichiometrical amounts) to a stream of gas containing sulfur dioxide, such as the gases issuing from a combustion chamber where hydrogen sulfide is burned to sulfur dioxide, at a temperature in the range of approximately 500° F. to 750° F. an abnormal temperature rise will occur almost immediately after the gases are mixed when there is even a small amount of excess oxygen present, the temperature rise being roughly indicative of the amount of oxygen present. I have also discovered that, under similar conditions, when there is even a small amount of excess hydrogen sulfide present in the sulfur dioxide stream the temperature immediately after mixing with the added hydrogen sulfide will be abnormally low. Although I do not wish to be limited to any theory, or completeness of theory, these effects are thought to be due partly to the fact that reaction 1 above proceeds much more rapidly than reaction 2, partly to the fact that reaction 1 evolves a much greater amount of heat than reaction 2, and partly to the probability that reaction 1 is somewhat reversible or incomplete resulting in the presence of some free oxygen and an equivalent amount of hydrogen sulfide, even when there is no excess of either. When the large excess of hydrogen sulfide is added, at the above temperatures, it is thought that the added hydrogen sulfide reacts immediately with the oxygen present according to Equation 1 causing an immediate temperature rise commensurate with the amount of free oxygen present. I have further discovered that this effect may be utilized to indicate a needed change in the flow of oxygen to a hydrogen sulfide combustion process of the nature outlined hereinbefore, and preferably can be caused to automatically make a correction in the flow of oxygen by use of conventional temperature control instruments.

The invention may be more readily understood by reference to the drawings which illustrate diagrammatically apparatus suitable for carrying out the invention. Figure 1 illustrates variations of the invention in which the ratio of oxygen to hydrogen sulfide supplied to a hydrogen sulfide combustion process is regulated in accordance with temperatures occurring at critical points within the main apparatus. Figure 2 illustrates variations of the invention involving a pilot reaction apparatus designed to control the oxygen supply to the main process in accordance with reaction temperatures attained in a sample stream of gases withdrawn from the main apparatus.

Referring to Figure 1, there is indicated a combustion chamber 1 communicating with heat exchanger 2, which in turn communicates with reaction chamber 3 through transfer line 4. Reaction chamber 3 is provided at its inlet end with a zone (or chamber) 5 of restricted cross-sectional area, preferably containing baffles 5'. Chamber 3 may preferably contain a bed of catalyst 6 of any suitable depth. Chamber 3 communicates through line 7 with sulfur condenser 8 containing cooling means indicated by coil 9.

In operation hydrogen sulfide supplied to the process through line 10 is divided into two streams, one entering combustion chamber 1 through line 16, the other entering chamber 5 through lines 17 and 18. By means of a suitable proportioning device, represented by valves 11 and 12 controlled by meters 13 and 14 through instrument 15, the two streams are so proportioned that the hydrogen sulfide content of the stream in line 18 is twice that of the stream in line 16. Simultaneously there is fed to combustion chamber 1 through lines 19 and 20 and control valve 21 sufficient air, or other oxygen containing gas, to burn the hydrogen sulfide entering through line 16 to sulfur dioxide. In the event that the hydrogen sulfide entering combustion chamber 1 through line 16 contains hydrocarbons or other combustible matter (as is commonly the case with waste hydrogen sulfide streams in oil refineries), sufficient additional air is supplied through line 20 to burn such combustible matter. Depending upon the composition and volume of the gases supplied to combustion chamber 1, the temperatures attained therein due to the heat of reaction usually range from about 1000° F. to many degrees higher.

The products from combustion chamber 1, which may comprise sulfur dioxide, water vapor, carbon dioxide and nitrogen, pass through heat exchanger 2 wherein they are cooled to a temperature suitable for reacting the sulfur dioxide content with additional hydrogen sulfide to form free sulfur. Ordinarily temperatures in the range of 500° F. to 750° F. are suitable. After cooling in heat exchanger 2, the gases are passed through line 4 to zone 5 of reactor 3 wherein they are mixed with the hydrogen sulfide stream entering through line 18. During the passage of the mixture through reactor 3, preferably containing catalyst 6, the hydrogen sulfide and sulfur dioxide react to form free sulfur which is condensed in condenser 8 and is withdrawn through line 22. The tail-gases leave condenser 8 through line 23. Due to the relatively low temperature in reactor 3, any hydrocarbons introduced with the hydrogen sulfide from line 18 normally pass through the reactor substantially unchanged. Accordingly, the tail-gases in line 23 will comprise chiefly nitrogen, water vapor, carbon dioxide, hydrocarbons, and any unreacted mixture of hydrogen sulfide and sulfur dioxide, providing the exact quantity of air needed is supplied through line 20. If desired, any unreacted hydrogen sulfide and sulfur dioxide contained in the tail-gases, if in the proper proportions, may be reacted by passage through one or more additional beds of catalyst.

From the description so far it will be readily appreciated that, if an excess of oxygen is fed to the process through line 20, the tail-gases from line 23 will contain objectionable amounts of sulfur dioxide. Likewise, if insufficient oxygen is supplied, the tail-gases will contain objectionable amounts of hydrogen sulfide. Hence, since the oxygen requirements vary in accordance with the hydrogen sulfide and hydrocarbon contents of the stream entering through line 10, for satisfactory operation correction must be made in the oxygen supply to compensate for changes in hydrogen sulfide and/or hydrocarbons fed to the process.

In accordance with the invention the supply of oxygen in line 20 is regulated in accordance with the temperature rise in chamber 5, i. e. the temperature occurring immediately after the mixing of the gases from line 4 with the hydrogen sulfide from line 18. To this end there is provided in chamber 5 a temperature sensitive element 24 (which may conveniently be a thermocouple or a thermometer-bulb of a temperature controller) adapted to actuate control instrument 25 to which it is connected. Control instrument 25, which may be any well known type of controller adapted to operate a valve in response to temperature signals from a temperature sensitive element, is arranged to regulate valve 21 in accordance with signals from element 24 in such a manner that an abnormal increase in the temperature indicated by element 24 will close down on valve 21 reducing the flow through line 20, and an abnormally low temperature of element 24 will cause valve 21 to open further to supply more air through line 20.

More accurate determination of the temperature rise in chamber 5 may be attained, with resultant increase of accuracy in operation of valve 21, by regulating the temperature of the gases in line 4 to a fixed predetermined temperature. This may be accomplished by controlling the cooling fluid entering exchanger 2 by means of control valve 26 operated by instrument 27 in response to the temperature indicated by temperature sensitive element 28 inserted in line 4.

Alternately, more accurate determination of the temperature rise in chamber 5 may be attained by providing temperature sensitive element 29 in line 4 and causing instrument 25 to regulate valve 21 in accordance with the temperature difference indicated by signals received from elements 29 and 24.

Since the adjustment of valve 21, as described above, is for the purpose of controlling the ratio of oxygen to hydrogen sulfide charged to the process, it will be readily apparent that, if for any reason it should so be desired, instrument 25 may be adapted to control the hydrogen sulfide stream instead of (or in addition to) the air-supply, by means of a suitable control valve in line 10 and/or line 30. Likewise, in lieu of completely automatic control, or as a supplement thereto, instrument 25 may be adapted to operate an alarm or other signal or indicating means, whereby an operator is advised adjustment of the oxygen to hydrogen sulfide ratio is needed, and such adjustment may be made manually if desired.

As is well known in the art, heat exchanger 2 may, if desired, be in the form of a steam boiler to take advantage of the waste heat by the generation of steam. As has been proposed by some, such boiler or heat exchanger may be designed partly or wholly, as an integral part of reaction chamber 1.

If desired, some or all of the hydrogen sulfide supplied through line 18 may be from a different source than that supplied through line 16, as for example a separate stream entering through line 30.

Valve 31 may be provided in the air-supply line for hand operation in emergencies, or for coarse adjustment of the air supply permitting finer adjustment with control valve 21.

In Figure 2 there are illustrated several variations of the invention where it may not be convenient or desirable to provide temperature sensitive elements within the main apparatus for the purpose of controlling air supply valve 21. In Figure 2 the parts corresponding to the same parts in Figure 1 bear the same numerals. The flow through the main apparatus represented by combustion chamber 1, heat-exchanger 2, reactor 3, and condenser 8, may be substantially the same as described with respect to Figure 1. One third of the hydrogen sulfide supply is introduced to reaction chamber 1 through line 16 along with air from line 20. Products of combustion are cooled in heat exchanger 2 and introduced into reactor 3 together with the remaining two-thirds of the hydrogen sulfide from line 18. Sulfur is condensed in condenser 8 and removed from line 22, while the tail-gases leave through line 23.

For the regulation of oxygen supply valve 21 a small sample stream of gas is removed from the gases leaving reaction chamber 1. This sample stream may conveniently be removed from line 4 as shown by pilot line 32 by opening valve 33, or it may be taken immediately after reaction chamber 1 and before heat exchanger 2 through valve 35 and pilot line 34. Preferably, the rate of flow of this sample stream is controlled to a predetermined value as indicated by flow meter 36 controlling valve 37. The sample stream is then brought to a predetermined temperature (suitable for subsequent reactions) by suitable means, such as is illustrated by passing through heat exchanger 38. Heat exchanger 38 may be either a heater or cooler as required to bring the gases leaving through line 39 to the required temperature. The heating or cooling needed may be controlled by temperature sensitive element 40 controlling the heating or cooling medium, such as is illustrated by instrument 41 controlling valve 42. The gases in line 39, having been brought to the required temperature, are introduced into pilot reactor 43, preferably containing baffles as shown. Simultaneously there is introduced into pilot reactor 43 a stream of hydrogen sulfide through line 44. This stream of hydrogen sulfide is controlled at a constant flow and advantageously may approximate the amount of hydrogen sulfide required to react with the sulfur dioxide entering pilot reactor 43 from line 39. Within pilot reactor 43 and near its outlet end is placed temperature sensitive element 45 so connected to control instrument 25 as to cause the latter to control valve 21 in the same manner as described above with respect to Figure 1 and element 24. If desired, additional control may be attained by providing temperature sensitive element 46 in line 39, whereby instrument 25 may control valve 21 in accordance with the temperature differential between elements 45 and 46.

The volume of the sample streams withdrawn through line 32 or 34 may be of any convenient size, but need not be more than a few cubic feet per minute, and the stream of hydrogen sulfide introduced through line 44 may be proportionately small. Likewise, the size of pilot reactor 43, heat exchanger 38, and the other pilot apparatus may be of any convenient size to handle the streams. Pilot reactor 43 need only be large enough to permit the immediate temperature rise to occur which results from the mixture of the hydrogen sulfide with the sample of combustion gases from reaction chamber 1 (for example, the temperature rise caused by the reaction between the hydrogen sulfide from line 44 and any free oxygen in the gases from line 39). Though pilot reactor 43 may be extended, if desired, and may contain catalyst downstream from element 45 in order to permit all of the hydrogen sulfide and sulfur dioxide to react with the production of sulfur, such is unnecessary and the gases after passing element 45 may be disposed of in any convenient manner, such as for example by introducing them into reactor 3 under suitable pressure. As an illustration, a pilot reactor two inches in diameter and twelve inches long, with a temperature sensitive element located eleven inches from the inlet gases, has been found to be satisfactory for a sample stream of combustion gases having a volume of about four s. c. f. per minute and a hydrogen sulfide stream (95% $H_2S$) of about one s. c. f. per minute. In this case an electric heater was used for exchanger 38 to bring the temperature of the gases to 700° F. Under these conditions, an increase of one percent in the rate of oxygen supplied to the main combustion chamber caused an increase of several degrees in the temperature rise over the rise occurring when the stoichiometric amount of oxygen was supplied to the combustion chamber, thus providing an adequate signal effect for instrument 25 to control valve 21 satisfactorily.

In some operations it may be desirable, in order to lighten the load on reactor 3 or for other reasons, to introduce into combustion chamber 1 part or all of the hydrogen sulfide in line 18, as through line 47 by manipulation of valves 48 and 49, thereby producing a substantial amount of sulfur prior to reactor 3. In such cases the invention may be practiced by withdrawing the sample stream of combustion gases from combustion chamber 1 at a point prior to where line 47 enters, as is indicated by valve 50 and line 51. When such operations are contemplated it may be desirable to provide a somewhat larger and/or more elongated combustion chamber 1 than is required when only one-third of the total hydrogen sulfide is burned. Also, a baffle 52 may advantageously be inserted in combustion chamber 1, to restrict gases entering chamber 1 through line 47 from contaminating the sample withdrawn through line 51.

It will readily be appreciated by those skilled in the art that the hydrogen sulfide stream introduced into pilot reactor 43 through line 44 should be maintained at a substantially constant temperature since large temperature variations in this stream would cause undesirable variations in the temperature at element 45 with consequent irregularities in the desired control. Although the hydrogen sulfide stream in line 44 may be controlled at any desired temperature, from below atmospheric up to that of the gas-stream in line 39 or even higher, it is usually sufficient to permit the hydrogen sulfide stream to attain room-temperature. It should be noted, however, that when the hydrogen sulfide in line 44 is at room-temperature (or any other temperature substantially below that of the gases in line 39) the introduction of this colder hydrogen sulfide into pilot reactor 43 will have a cooling effect on the gases introduced through line 39, and this cooling effect may even be of greater magnitude than the temperature rise, described hereinbefore, resulting from the reaction of the gases in reactor 43. Consequently, under such circumstances, the temperature of element 45 may be below that of element 46 or element 40. This, however, is of no consequence in the practice of the invention, since instrument 25 may be zeroed for whatever temperature at element 45 (or for whatever temperature differential between element 46 and element 45) is found by trial to correspond to the proper flow of air through valve 21. A similar situation exists with respect to the embodiments of the invention described in relation to Figure 1, where the hydrogen sulfide stream from line 18, unless maintained at a high temperature, may cool the gases entering chamber 5 from line 4 to such an extent that the temperature of element 24 may normally be below that of the gases in line 4.

In any case instrument 25 (Figure 1) may be zeroed at whatever temperature at element 24 (or differential temperature between elements 24 and 29) is found to give the proper flow of oxygen through valve 21. Consequently, wherever used in this connection in the foregoing description and in the appended claims, the term "temperature rise" will be understood to mean the increase in temperature above that which would result from the mere mixing of the hydrogen sulfide and combustion gases in the absence of any reaction between the two.

As will be apparent from the description of Figure 2, the invention is broadly applicable to the indication of free oxygen in a mixture of gases containing sulfur dioxide, such as the reaction gases from combustion chamber 1, regardless of what disposition might be made of these gases in lieu of the production of free sulfur such as represented in Figure 2 as occurring in reactor 3. Likewise, other modifications may be made within the scope of the appended claim.

It may be mentioned that control instruments, such as represented in the drawings by numerals 15, 25, 27, 36, and 41, suitable for controlling valves in response to predetermined temperature or flow conditions are well known on the market and are in common use in various industries. Hence details of the construction of such instruments are deemed unnecessary for this description.

I claim:

The process of producing sulphur which comprises dividing a preponderantly hydrogen sulphide gas stream into two portions the first of which is one-half the volume of the second, burning the first portion with gas containing free oxygen under conditions sufficient to convert substantially all the hydrogen sulfide in said first portion to sulfur dioxide, withdrawing a small but fixed-volume pilot stream from the products of combustion, cooling the pilot stream, causing the cooled pilot stream to react with a pilot stream of hydrogen sulphide, regulating the ratio of oxygen to total hydrogen sulfide fed to the process in accordance with the immediate temperature rise in the pilot reaction occurring at a point in said pilot reaction before a predominate amount of the sulfur dioxide is converted to sulfur, adding at least part of said second portion to the products of reaction at a point beyond the removal of the pilot stream while said products are at elevated temperature whereby further reaction occurs forming free sulfur, cooling the products of said further reaction to a temperature of about 500° F. to about 750° F., adding any remaining part of said second portion, and passing the mixture through a catalytic bed under conditions to form further sulfur.

HERBERT M. ANDERSON.

References Cited in the file of this patent

UNITED STATES PATENTS

| Number | Name | Date |
|---|---|---|
| 1,467,397 | Schuck | Sept. 11, 1923 |
| 1,644,123 | Griswold | Oct. 4, 1927 |
| 1,923,865 | Handforth | Aug. 22, 1933 |
| 2,048,656 | Hunt et al. | July 21, 1936 |
| 2,092,386 | Baehr et al. | Sept. 7, 1937 |
| 2,169,379 | Barkholt | Aug. 15, 1939 |